(12) United States Patent
Lee

(10) Patent No.: US 8,171,817 B2
(45) Date of Patent: May 8, 2012

(54) CONTROL SHIFT ASSEMBLY FOR MANUAL TRANSMISSION

(75) Inventor: Kyung Woo Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 765 days.

(21) Appl. No.: 12/325,911

(22) Filed: Dec. 1, 2008

(65) Prior Publication Data

US 2009/0151497 A1    Jun. 18, 2009

(30) Foreign Application Priority Data

Dec. 14, 2007  (KR) .................. 10-2007-0131650

(51) Int. Cl.
*F16H 59/04*   (2006.01)
*G05G 5/08*   (2006.01)

(52) U.S. Cl. ............... 74/473.36; 74/473.25; 74/473.26

(58) Field of Classification Search ............... 74/473.1, 74/473.21, 473.22, 473.24, 473.25, 473.26, 74/473.28, 473.36, 473.37

See application file for complete search history.

(56) References Cited

U.S. PATENT DOCUMENTS

| 4,320,670 A | * | 3/1982 | Kawamoto | 74/473.24 |
| 4,807,489 A | * | 2/1989 | Schreiner et al. | 74/473.28 |
| 7,441,476 B2 | * | 10/2008 | Schafer et al. | 74/473.36 |

FOREIGN PATENT DOCUMENTS

| KR | 10-0680588 B1 | 2/2007 |
| KR | 10-0727565 B1 | 6/2007 |

* cited by examiner

*Primary Examiner* — Thomas R Hannon
*Assistant Examiner* — Phillip A Johnson
(74) *Attorney, Agent, or Firm* — Morgan, Lewis & Bockius LLP

(57) ABSTRACT

A control shaft assembly for a manual transmission may include a control shaft that is reciprocated in a rectilinear direction and is rotated by a shift lever, a control finger unit that is mounted on one side of the control shaft and moves together with the control shaft and prevents dual engagement of gears while shifting, a guide body that is spaced apart from the control finger unit to be mounted on the control shaft and that guides shift positions of the control shaft, and a shift position detecting unit that is disposed between the other side of the control shaft and a transmission case and that detects shift positions while shifting up and down.

17 Claims, 5 Drawing Sheets

(a)  (b)

CONTROL SHIFT ASSEMBLY FOR MANUAL TRANSMISSION

CROSS-REFERENCE TO RELATED APPLICATION

The present application claims priority to Korean Patent Application No. 10-2007-0131650 filed on Dec. 14, 2007, the entire contents of which application is incorporated herein for all purposes by this reference.

BACKGROUND OF THE INVENTION

1. Field of the Invention

The present invention relates to a control shaft assembly for a manual transmission, and more particularly to a control shaft assembly for a manual transmission that is operated by a shift lever.

2. Description of Related Art

Generally, a transmission changes a gear through a shift lever, and includes a select and shift cable that transfers handling force corresponding to the position of the shift lever.

Also, the transmission includes a control shaft assembly that is connected to the select and shift cable and a shift fork assembly that operates a synchronizing device according to the movement of the control shaft assembly.

Here, the control shaft assembly includes a control shaft that is connected to a shift lever and is reciprocated in a rectilinear direction, and a shift rail that operates a synchronizer equipped in a respective shift gear according to the movement of the control shaft.

Further, a control finger is mounted on the control shaft and a shift lug is mounted on the shift rail that is operated by the control finger.

That is, the shift finger moves to one position of the shift rail while changing a gear by a select motion of the control shaft that moves in an axial direction thereof.

Also, the control finger operates the shift lug that is mounted on the shift rail by a rotation of the control shaft, and thereby the synchronizers that are mounted on the respective gears are operated to gear up or down.

However, in the control shaft assembly, the length of an arm of a interlock plate needs to become longer as the length of the control finger become longer, and when the arm of the interlock plate becomes wider to the outside of an opening by a shift lug while changing a gear, the interlock plate can malfunction.

Also, when the control shaft is moved in an axial direction a shift stroke can be excessive, and when the control shaft is to be recovered to the neutral position for the next shift the control finger cannot be recovered to the original position by the shift lug, and further when the control finger is recovered to the original position the shift feel can be deteriorated by excessive contact with the shift lug.

The information disclosed in this Background of the Invention section is only for enhancement of understanding of the general background of the invention and should not be taken as an acknowledgement or any foam of suggestion that this information forms the prior art already known to a person skilled in the art.

BRIEF SUMMARY OF THE INVENTION

Various aspects of the present invention are directed to provide a control shaft assembly for a manual transmission having advantages of preventing over-stroke, improving security, and smoothing shifting while changing gears. An exemplary embodiment of the present invention provides a control shaft assembly for a manual transmission having advantages of preventing an arm member of an interlocking plate from becoming wider to thus malfunction, simplifying a shape of the arm member while it is being manufactured, and detecting accurate gear shift speeds by applying a shift position detecting unit to prevent the malfunction of the shift and over-stroke of the gear while shifting up or down.

In an aspect of the present invention, a control shaft assembly for a manual transmission, may include a control shaft that is reciprocated in a rectilinear direction through a transmission case and is rotated by a shift lever, a control finger unit fixed to the control shaft and moving together with the control shaft, a guide body fixed to the control shaft and guiding a shift position of the control shaft to prevent dual engagement of gears while shifting the gears, and/or a shift position detecting unit mounted to the control shaft for detecting the shift position of the control shaft.

The control finger unit may include a control finger and an interlocking plate mounted to the control shaft and coupled each other.

The interlocking plate may include a second shaft connective portion that is mounted on the control shaft, and/or an arm member in which an opening is formed to receive a portion of the control finger.

The control finger, the interlocking plate, and the guide body may be sequentially disposed on the control shaft such that over-stroke of the control shaft can be prevented.

The control finger may include a first shaft connective portion that is mounted on the control shaft, and/or an engaging member that is extended from the first shaft connective portion with a predetermined distance.

The interlocking plate may include a second shaft connective portion that is mounted on the control shaft, and/or an arm member in which an opening is formed for the engaging member of the control finger to be coupled thereto.

Distal end portion of the opening may be opened outwards to receive the engaging member of the control finger therethrough.

Thickness of the opening of the interlocking plate and the engaging member of the control finger unit may be substantially the same.

the opening of the interlocking plate and the engaging member of the control finger unit may be aligned in a radial direction from the control shaft.

The guide body may include a guide portion having a plurality of longitudinal grooves to guide longitudinal movement of the control shaft, wherein the longitudinal grooves are aligned in a longitudinal axis of the control shaft and slidably engaged with a protrusion formed at the transmission case.

The guide portion may further include a traverse groove to guide rotational movement of the control shaft, wherein the traverse groove is aligned in perpendicular to the longitudinal grooves.

The shift position detecting unit may include a lever stopper including a third shaft connective portion that is fixed to the control shaft and an extended portion that is extended from the third shaft connective portion in a radial direction thereof, and/or an actuating member mounted on the transmission case and coaxially coupled to and providing an elastic force to the extended portion of the lever stopper to detect the shift position of the control shaft.

The actuating member may be a plunger set mounted on the transmission case and configured to correspond to center portion of the extended portion of the lever stopper.

The plunger set may include a plunger that is disposed corresponding to the center portion of the extended portion of the lever stopper in the neutral position and that is configured to be movable inside the transmission case according to rotation of the control shaft, and/or an elastic member that is interposed between the plunger and a seal plug to elastically support the plunger.

Forward end portion of the plunger may have a ball shape to be roller-contacted with end surface of the extended portion of the lever stopper, and a mounting groove through which the elastic member is inserted is formed in rear end portion of the plunger.

End surface of the extended portion of the lever stopper may have a predetermined shape so as to prevent an over-stroke of a reverse speed, a fifth speed, and a sixth speed. The predetermined shape may be a concave shape formed toward the center shaft, the concave shape having a plurality of slanted surfaces thereto.

The plurality of slanted surfaces may include a center groove formed in center portion of the extended portion to detect a neutral position, a first slanted surface formed in a direction of first and second speeds, a second slanted surface formed in a direction of the fifth and sixth speeds, and/or a third slanted surface formed in a direction of the reverse speed, wherein a reverse over-stroke prevention bump and a fifth/sixth speed over-stroke prevention bump are formed at distal end portions of the end surface in a cross section of the extended portion of the lever stopper.

The reverse over-stroke prevention bump, the third slanted surface, the first slanted surface, the center groove, the second slanted surface, and the fifth/sixth speed over-stroke prevention bump may be formed on the end surface sequentially in the cross section of the extended portion of the lever stopper.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
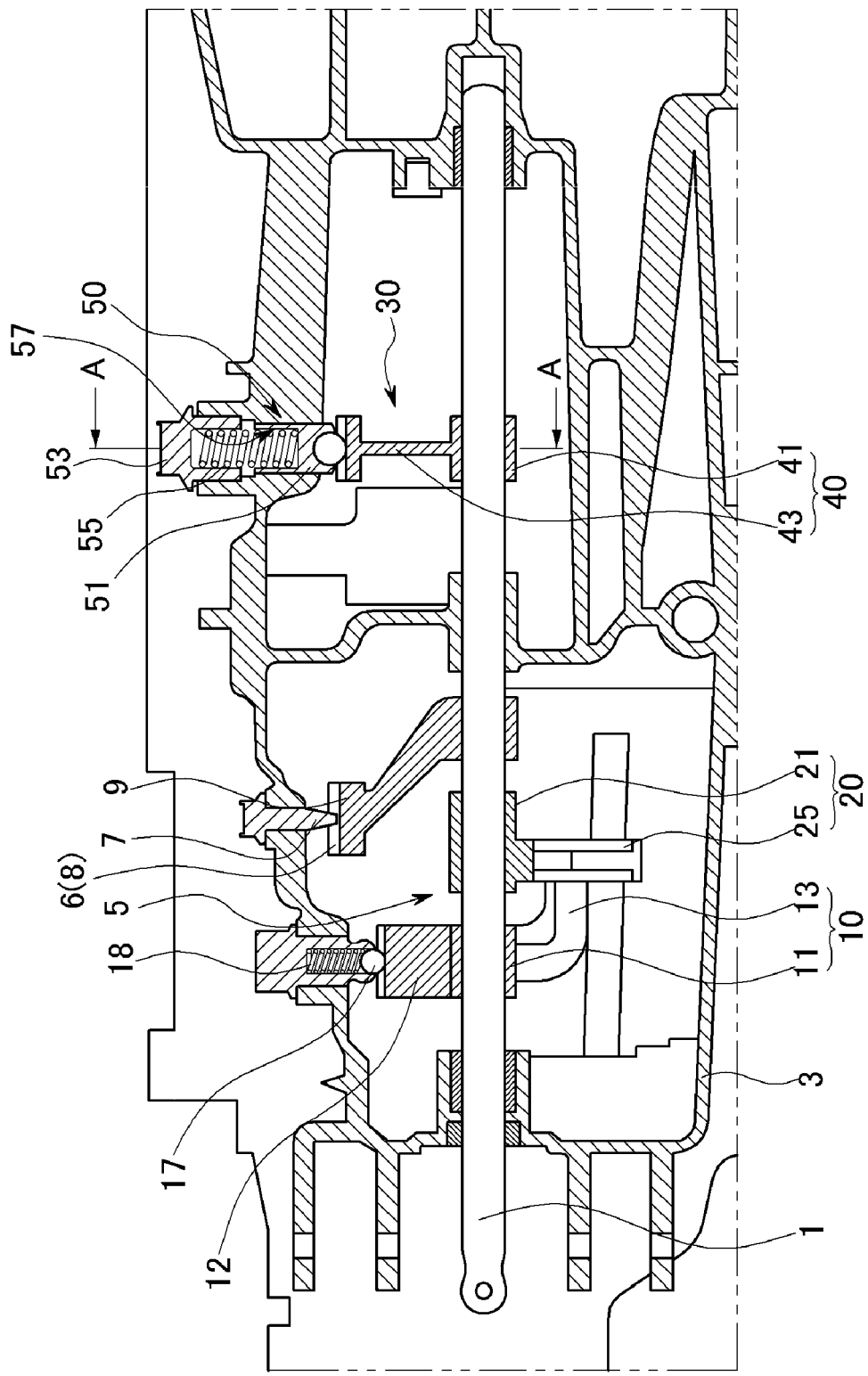
FIG. 1 is a partial cross-sectional view of a transmission case in which a control shaft assembly for a manual transmission is applied according to an exemplary embodiment of the present invention.
Figure 2:
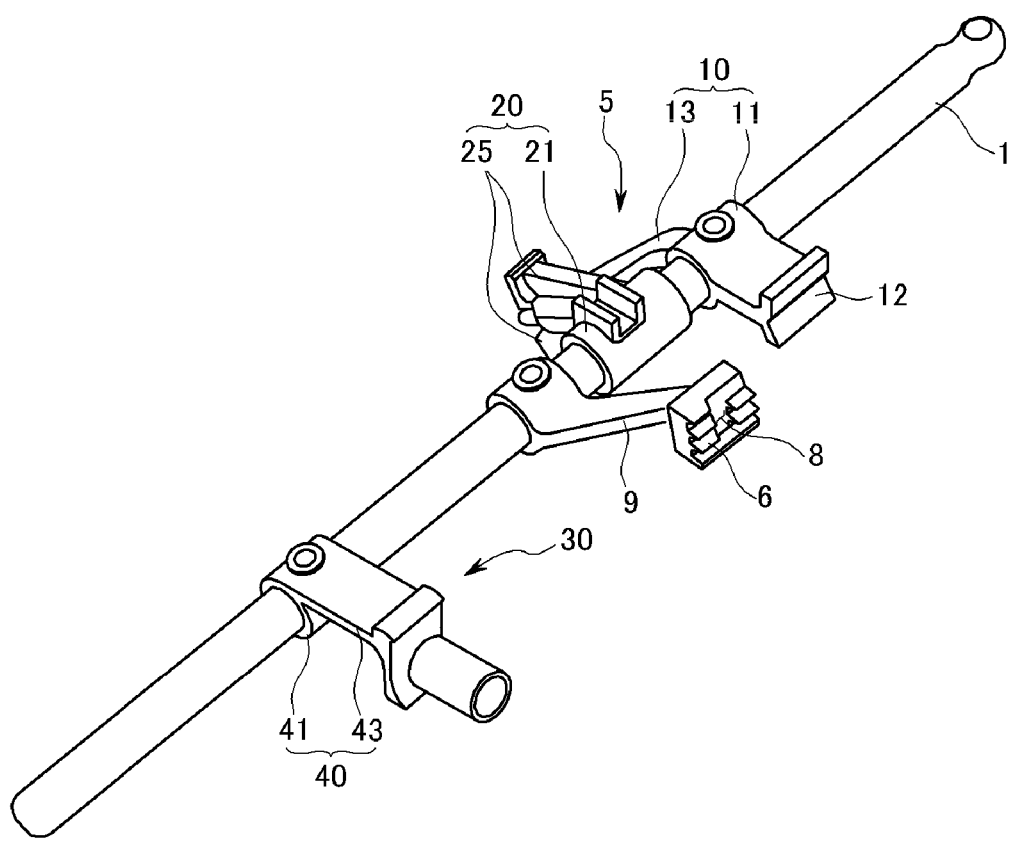
FIG. 2 is a perspective view of a control shaft assembly for a manual transmission according to an exemplary embodiment of the present invention.
Figure 3:
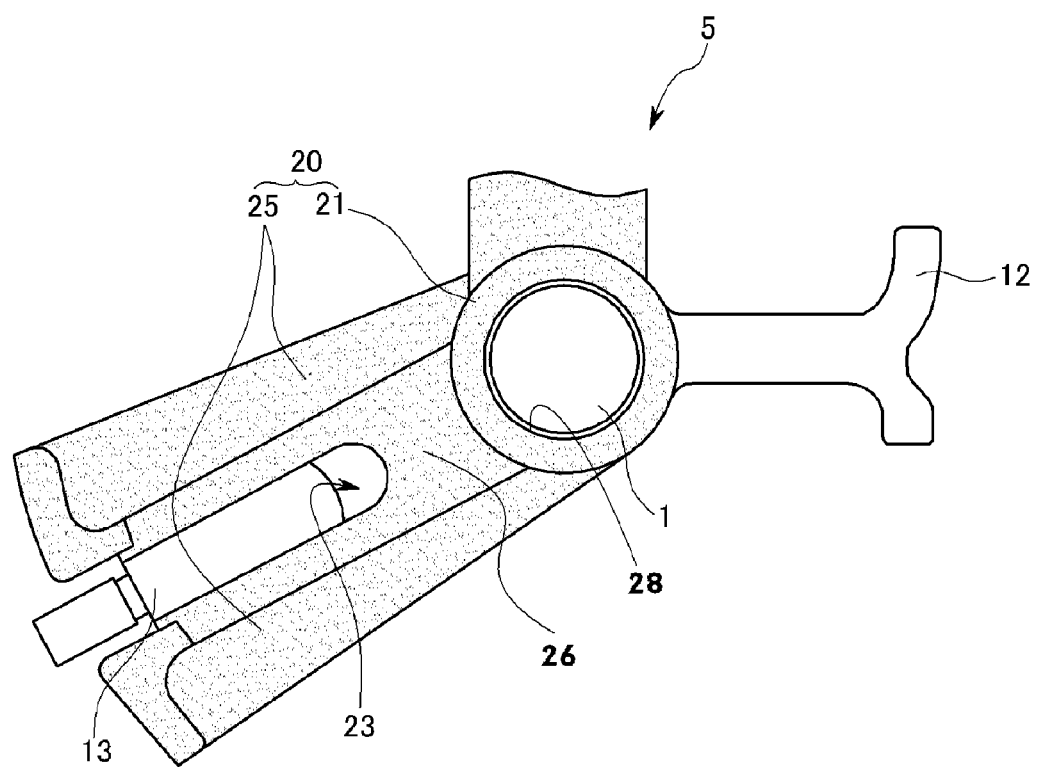
FIG. 3 is a side view of a control finger unit corresponding to an A-A line of FIG. 1 according to an exemplary embodiment of the present invention.
Figure 4:
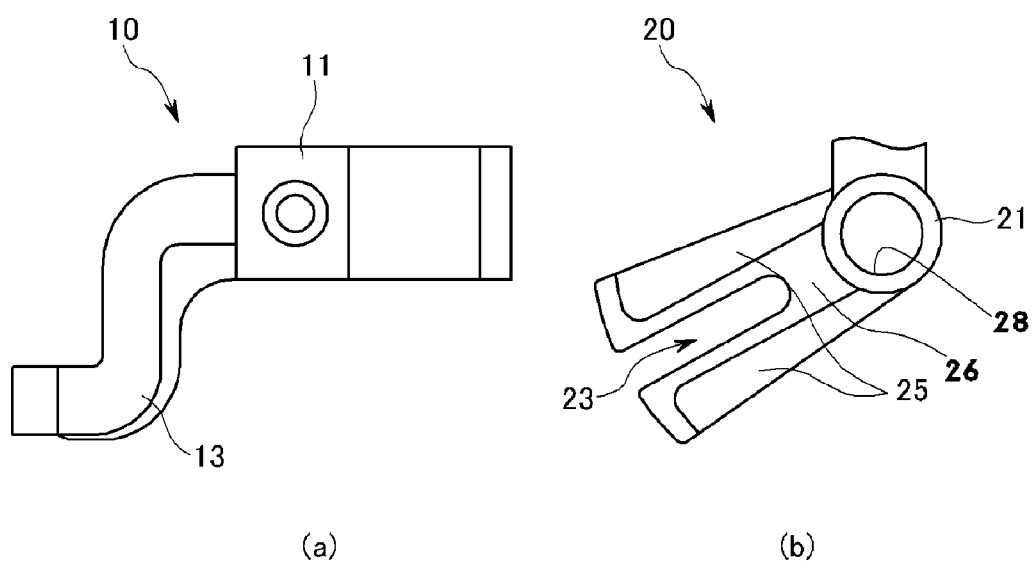
FIG. 4 is an exploded view of a control finger unit according to an exemplary embodiment of the present invention.
Figure 5:
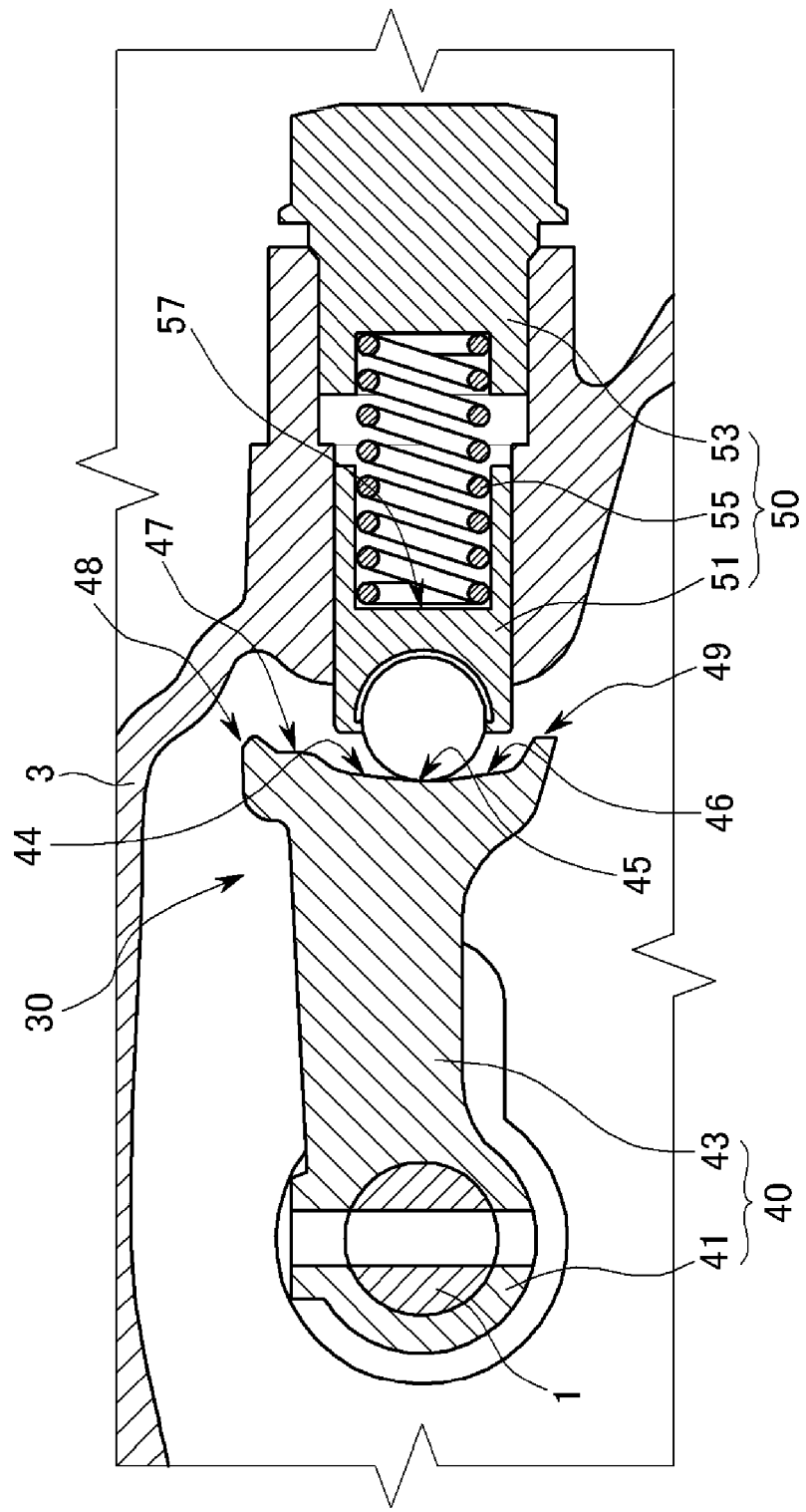
FIG. 5 is a cross-sectional view of a shift position detecting unit corresponding to an A-A line of FIG. 1 according to an exemplary embodiment of the present invention.

FIG. 1 is a partial cross-sectional view of a transmission case in which a control shaft assembly for a manual transmission is applied according to an exemplary embodiment of the present invention; FIG. 2 is a perspective view of a control shaft assembly for a manual transmission according to an exemplary embodiment of the present invention; FIG. 3 is a side view of a control finger unit corresponding to A-A line of FIG. 1 according to an exemplary embodiment of the present invention; FIG. 4 is an exploded view of a control finger unit according to an exemplary embodiment of the present invention; and FIG. 5 is a cross-sectional view of a shift position detecting unit corresponding to a A-A line of FIG. 1 according to an exemplary embodiment of the present invention.

As shown in FIG. 1 and FIG. 2, in a control shaft assembly for a manual transmission according to an exemplary embodiment of the present invention, a control shaft 1 is disposed inside a transmission case 3, and is connected to a shift lever to be reciprocated in a rectilinear direction and to be rotated by the shift lever.

A control finger unit 5 is mounted on one side of the control shaft 1, moves together with the control shaft 1, transfers a shift force for changing a gear, and prevents dual engagement of gears.

As shown in FIG. 2, the control finger unit 5 includes a control finger 10 that is fixed to the control shaft 1 and an interlocking plate 20 that is connected to the control shaft 1 to be engaged thereto.

The control finger 10 includes a first shaft connective portion 11 that is fixed to the control shaft 1 and an engaging member 13 that is extended from the first shaft connective portion 11.

The control finger 10 further includes a guide portion 12 that is formed at one end of the first shaft connective portion 11. The guide portion 12 is concavely-shaped to receive a ball 17 therein. The ball 17 is pressed toward the guide portion 12 of the control finger 10, wherein the ball 17 is biased by a spring member 18 positioned at the transmission case 3.

As shown in (a) of FIG. 4, the engaging member 13 of the control finger 10 is extended toward the transmission case 3 from the first shaft connective portion 11, then is bent in a rearward direction along the longitudinal axis of the control shaft 1, and then is bent toward the transmission case 3 to have a such bent shape.

The interlocking plate 20 prevents the control finger 10 from being detached from a shift lug when the control shaft 1 moves in a rectilinear direction, and prevents gears from being dually engaged while shifting up/down.

As shown in (b) of FIG. 4, the interlocking plate 20 includes a second shaft connective portion 21 that is coupled to the control shaft 1, and an arm member 25 in which an opening 23 through which the engaging member 13 of the control finger 10 is inserted is formed.

In this case, the opening 23 of the interlocking plate 20 is flatly ground, and it is desirable that the surface of the engaging member 13 of the control finger 10 that contacts the opening 23 is also flatly ground.

In an exemplary embodiment of the present invention, the opening 23 of the interlocking plate 20 and the engaging member 13 of the control finger 10 may have substantially the same thickness and aligned in a radial direction of the control shaft 1.

Accordingly, in this configuration, the length of the opening 23 of the control finger unit 5 for mutual sliding of the control finger 10 and the interlocking plate 20 is irrelevant to the length of the control finger 10.

Furthermore, since an reinforce portion 26 is disposed in the arm member 20 between an interior circumference 28 of the shaft connective portion 21 and the opening 23 and thus the arm member 25 of the interlocking plate 20 does not become wider in radial direction thereof, the malfunction of the interlocking plate 20 is prevented.

Also, mechanical treatment of the outer surface of the control finger 10 and the inner surface of the interlocking plate 20 can be omitted by the mutual sliding structure between the control shaft 1 and the interlocking plate 20 such that the manufacturing process becomes simple.

Further, a guide body 9 is fixed on the control shaft 1 to be spaced apart from the control finger unit 5 by a predetermined length.

The guide body 9 guides a shift position of the control shaft 1 through longitudinal and traverse guide grooves 6 and 8 formed at one end portion thereof A protrusion 7 is formed at inner surface of the transmission case 3 and the longitudinal and traverse guide grooves 6 and 8 are slidably engaged with the protrusion 7 according to rotation of the control shaft 1 so as to prevent dual engagement of gears while changing gears.

A shift position detecting unit 30 is disposed between the transmission case 3 and the other side of the control shaft 1.

The shift position detecting unit 30 detects the gear shift speed that is engaged to prevent a malfunction of the engagement while changing gears.

As shown in FIG. 5, the shift position detecting unit 30 includes a lever stopper 40 and a plunger set 50.

The lever stopper 40 includes a third shaft connective portion 41 through which the shift position detecting unit 30 is mounted to the control shaft 1 and an extended portion 43 that is extended from the third shaft connective portion 41 toward the transmission case 3.

In this case, the end surface of the extended portion 43 of the lever stopper 40 has a predetermined concave shape to detect the shift position of the control shaft 1 and to prevent the over-stroke of a reverse, a fifth, and a sixth speed.

With respect to the center of the end surface of the extended portion 43 of the lever stopper 40, a slanted surface 44 is formed in a direction of the first and second speeds, a slanted surface 46 is formed in a direction of the fifth and sixth speeds, and the middle of the slanted surfaces 44 and 46 is a neutral position 45 of the gear shifting.

In addition, a reverse boundary step 47 is formed in one side of the slanted surface 44 with regard to the first and second speeds, and a reverse over-stroke prevention bump 48 is formed in one end portion of the reverse boundary step 47.

A fifth and sixth speed over-stroke prevention bump 49 is formed in the other end portion of the slanted surface 46 in a direction of the fifth and sixth speeds.

The plunger set 50 is disposed in one side of the transmission case 3 corresponding to end portion of the extended portion 43 of the lever stopper 40.

The plunger set 50 includes a plunger 51, a seal plug 53, and a spring 55.

The plunger 51 is disposed inside the transmission case 3 to be movable corresponding to the position of the extended portion 43 of the lever stopper 40.

The seal plug 53 is mounted on the outside of the transmission case 3 corresponding to the plunger 51.

The spring 55 is interposed between the plunger 51 and the seal plug 53.

In this case, the forward end portion of the plunger 51 has a ball shape to be roller-contacted with end surface of the extended portion 43 of the lever stopper 40, and a mounting groove 57 is formed for the spring 55 to be inserted in the rear end portion of the plunger 51.

In the shift position detecting unit 30 having the above construction, the forward end portion of the plunger 51 contacts the slanted surface 44 in a direction of the first and second speeds, with the slanted surface 46 in a direction of the fifth and sixth speeds, with the center of the slanted surfaces 44 and 46 of the neutral position 45 of the gear shifting, and with the reverse boundary step 47 to detect the reverse shift position.

Further, the plunger 51 of the plunger unit 30 is entangled in the reverse over-stroke prevention bump 48 and the fifth and sixth speed over-stroke prevention bump 49, and then an elastic force of the spring 55 prevents the over-stroke.

That is, the end surface of the extended portion 43 of the lever stopper 40 and the plunger unit 50 can accurately detect the shift position and prevent the malfunctions and the over-stroke of the first, second, and reverse gears while shifting up/down.

In various aspect of the present invention, accordingly, a control shaft assembly for a manual transmission of the present invention prevents the arm member 25 of the interlocking plate 20 from becoming wider through the control finger unit 5 such that the malfunction of the interlocking plate 20 does not occur.

By the mutual sliding of the control shaft 1 and the interlocking plate 20, the treatment of the outer surface of the control finger 10 and the inner surface of the interlocking plate 20 can be omitted to make the manufacturing thereof easier.

Also, in the shift position detecting unit 30, the simple structure of the plunger unit 50 and the end surface of the extended portion 43 of the lever stopper 40 can accurately detect the shift position and prevent the malfunction of gear engagement and the detachment of the shift position.

Further, the control finger 10, the interlocking plate 20, and the guide body 9 are sequentially disposed on the control shaft such that the over-stroke of the control shaft 1 can be prevented.

For convenience in explanation and accurate definition in the appended claims, the terms "left", "inner", "lower", "forward", and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control shaft assembly for a manual transmission, comprising:
a control shaft that is reciprocated in a rectilinear direction through a transmission case and is rotated by a shift lever;

a control finger unit fixed to the control shaft and moving together with the control shaft;
a guide body fixed to the control shaft and guiding a shift position of the control shaft to prevent dual engagement of gears while shifting the gears; and
a shift position detecting unit mounted to the control shaft for detecting the shift position of the control shaft;
wherein the shift position detecting unit comprises:
a lever stopper including a third shaft connective portion that is fixed to the control shaft and an extended portion that is extended from the third shaft connective portion in a radial direction thereof; and
an actuating member mounted on the transmission case and coaxially coupled to and providing an elastic force to the extended portion of the lever stopper to detect the shift position of the control shaft;
wherein an end surface of the extended portion of the lever stopper has a predetermined shape so as to prevent an over-stroke of a reverse speed, a fifth speed, and a sixth speed;
wherein the predetermined shape is a concave shape formed toward a center shaft, the concave shape having a plurality of slanted surfaces thereto;
wherein the plurality of slanted surfaces include:
a center groove formed in a center portion of the extended portion to detect a neutral position;
a first slanted surface formed in a direction of first and second speeds;
a second slanted surface formed in a direction of the fifth and sixth speeds; and
a third slanted surface formed in a direction of the reverse speed, and
wherein a reverse over-stroke prevention bump and a fifth/sixth speed over-stroke prevention bump are formed at end portions of the end surface in a cross section of the extended portion of the lever stopper.

2. The control shaft assembly for the manual transmission of claim 1, wherein the control finger unit comprises a control finger and an interlocking plate mounted to the control shaft and coupled each other.

3. The control shaft assembly for the manual transmission of claim 2, wherein the interlocking plate includes:
a second shaft connective portion that is mounted on the control shaft; and
an arm member in which an opening is formed to receive a portion of the control finger.

4. The control shaft assembly for the manual transmission of claim 2, wherein the control finger, the interlocking plate, and the guide body are sequentially disposed on the control shaft such that over-stroke of the control shaft is prevented.

5. The control shaft assembly for the manual transmission of claim 4, wherein the control finger comprises:
a first shaft connective portion that is mounted on the control shaft; and
an engaging member that is extended from the first shaft connective portion with a predetermined distance.

6. The control shaft assembly for the manual transmission of claim 5, wherein the interlocking plate includes:
a second shaft connective portion that is mounted on the control shaft; and
an arm member in which an opening is formed for the engaging member of the control finger to be coupled thereto.

7. The control shaft assembly for the manual transmission of claim 6, wherein an end portion of the opening is opened outwards to receive the engaging member of the control finger therethrough.

8. The control shaft assembly for the manual transmission of claim 6, wherein a thickness of the opening of the interlocking plate and the engaging member of the control finger unit is substantially the same.

9. The control shaft assembly for the manual transmission of claim 6, wherein the opening of the interlocking plate and the engaging member of the control finger unit are aligned in a radial direction from the control shaft.

10. The control shaft assembly for the manual transmission of claim 1, the guide body includes a guide portion having a plurality of longitudinal grooves to guide longitudinal movement of the control shaft, wherein the longitudinal grooves are aligned along a longitudinal axis of the control shaft and slidably engaged with a protrusion formed in the transmission case.

11. The control shaft assembly for the manual transmission of claim 10, the guide portion further includes a traverse groove to guide rotational movement of the control shaft, wherein the traverse groove is aligned perpendicular to the longitudinal grooves.

12. The control shaft assembly for the manual transmission of claim 1, wherein the actuating member is a plunger set mounted on the transmission case and configured to correspond to a center portion of the extended portion of the lever stopper.

13. The control shaft assembly for the manual transmission of claim 12, wherein the plunger set comprises:
a plunger that is disposed corresponding to the center portion of the extended portion of the lever stopper in a neutral position and that is configured to be movable inside the transmission case according to a rotation of the control shaft; and
an elastic member that is interposed between the plunger and a seal plug to elastically support the plunger.

14. The control shaft assembly for the manual transmission of claim 13, wherein a forward end portion of the plunger has a ball shape to be roller-contacted with an end surface of the extended portion of the lever stopper, and a mounting groove through which the elastic member is inserted is formed in a rear end portion of the plunger.

15. The control shaft assembly for the manual transmission of claim 1, wherein the reverse over-stroke prevention bump, the third slanted surface, the first slanted surface, the center groove, the second slanted surface, and the fifth/sixth speed over-stroke prevention bump are formed on the end surface sequentially in the cross section of the extended portion of the lever stopper.

16. A passenger vehicle comprising the control shaft assembly for the manual transmission of claim 1.

17. A control shaft assembly for a manual transmission, comprising:
a control shaft that is reciprocated in a rectilinear direction through a transmission case and is rotated by a shift lever;
a control finger unit fixed to the control shaft and moving together with the control shaft;
a guide body fixed to the control shaft and guiding a shift position of the control shaft to prevent dual engagement of gears while shifting the gears; and
a shift position detecting unit mounted to the control shaft for detecting the shift position of the control shaft;
wherein the control finger unit comprises a control finger and an interlocking plate mounted to the control shaft and coupled each other;
wherein the interlocking plate includes:
a shaft connective portion that is mounted on the control shaft; and an arm member in which an opening is formed to receive a portion of the control finger;

wherein an end portion of the opening is opened outwards to receive an engaging member of the control finger therethrough;

wherein a thickness of the opening of the interlocking plate and the engaging member of the control finger unit is substantially the same;

wherein the opening of the interlocking plate and the engaging member of the control finger unit are aligned along a radial direction from the control shaft; and wherein an reinforce portion is disposed in the arm member between an interior circumference of the shaft connective portion and the opening.

* * * * *